J. T. BEASLEY.
PLOW OR CULTIVATOR ATTACHMENT.
APPLICATION FILED JULY 19, 1918.
1,369,954.
Patented Mar. 1, 1921.
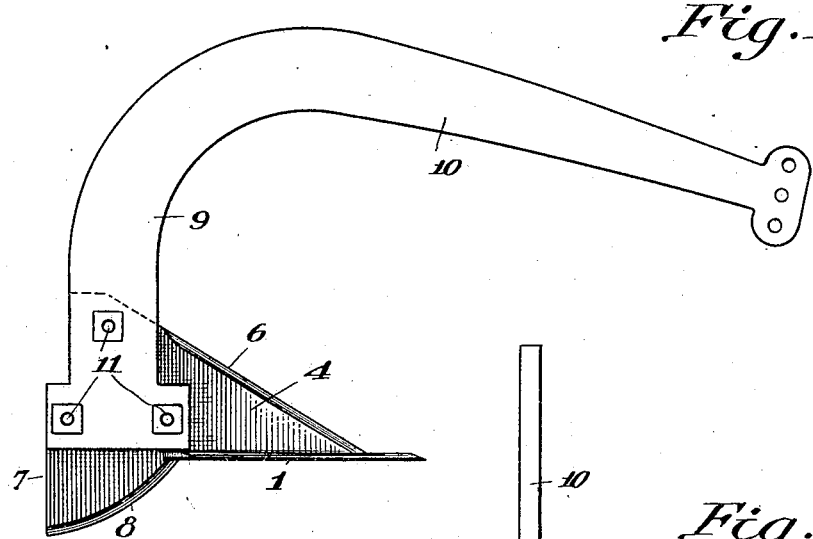
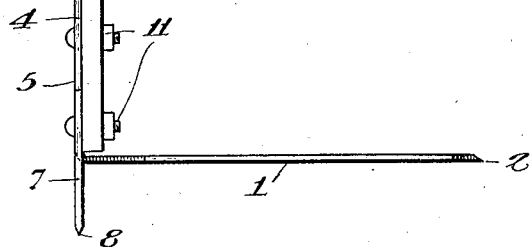
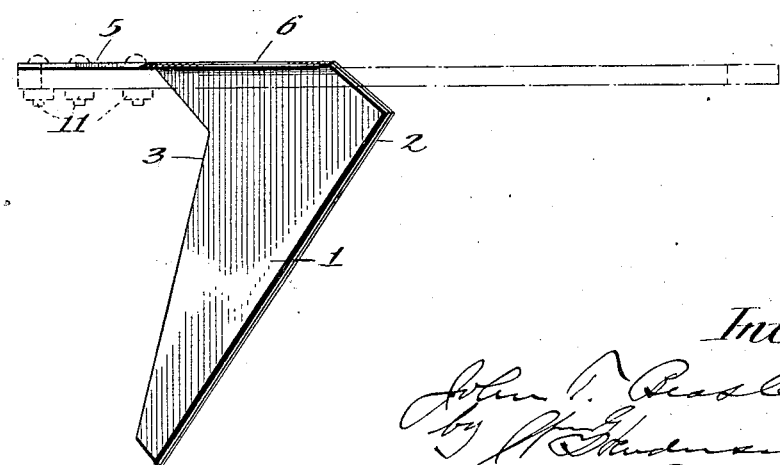
Inventor:
John T. Beasley,
by W. G. Henderson,
Attorney.

UNITED STATES PATENT OFFICE.

JOHN T. BEASLEY, OF BLAKELY, GEORGIA.

PLOW OR CULTIVATOR ATTACHMENT.

1,369,954.  Specification of Letters Patent.  Patented Mar. 1, 1921.

Application filed July 19, 1918. Serial No. 245,728.

*To all whom it may concern:*

Be it known that I, JOHN T. BEASLEY, a citizen of the United States, residing at Blakely, in the county of Early and State of Georgia, have invented certain new and useful Improvements in Plow or Cultivator Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to plows or cultivators; and it has for its object to provide an attachment comprising a share, colter, landside, and steadying or guiding blade formed as a unitary structure and adapted for attachment to any approved type of plow beam and standard. The attachment is particularly well adapted for use as a cultivator and also as a plow for working peanut vines. The broad share serves to cut beneath the top soil, the colter to cut in a vertical plane on the landside and also serves as a landside, and the steadying or guiding blade, located beneath the standard, serves to steady the implement and prevent skidding, and the colter also serves as a brace to stiffen the attachment and afford strength at the union or juncture between the landside, share and anchor.

To the accomplishment of the foregoing and such other objects as may hereinafter appear the invention consists in the features hereinafter particularly described and then sought to be clearly defined by the claims, reference being had to the accompanying drawing forming a part hereof and in which—

Figure 1 is a side view of a plow beam and standard with the attachment applied;

Fig. 2 is a plan view of the attachment, with the beam and standard shown in dotted lines;

Fig. 3 is a rear end view of Fig. 1.

In the drawing the numeral 1 designates the share which lies in a horizontal plane and has a substantially V shaped front cutting edge 2, and a cut out portion 3 at the rear to permit the prompt deposit of the upturned soil at the rear of the share and to reduce the frictional contact area of the share. The colter is designated by the numeral 4 and extends from the forward portion of the share to the shank 5. It stands in an upright plane and has a downwardly inclined top cutting edge 6, and serves also as a landside for the attachment. From the lower side of the shank 5 extends a guiding blade 7 which projects below the plane of the share and is formed with a cutting edge 8 curving rearwardly and downwardly from its juncture with the share. This guiding blade serves to prevent skidding of the implement when in use and also serves to act as a cutter for the roots of vines along the landside below the line of the cut made by the combined landside and colter. The share, landside and colter and guiding blade are made of steel and cut and bent or pressed into the shape described. The share is braced and strengthened in a vertical plane by the colter and landside and the latter is braced and strengthened in a horizontal plane by the share and guiding blade, and the upper portion of the guiding blade and the landside and colter are stiffened and braced by their union with the shank by which the attachment is connected to the stock and beam. As shown, the attachment is connected to the stock 9 of the beam 10 by bolts and nuts 11 but it may be otherwise attached.

The implement is adapted for attachment to any approved type of stock and beam, and is made and put on the market as a unitary structure attachment. When necessary it is readily detached from the stock and its cutting edges sharpened and then replaced, and when worn out is easily replaced by another.

Having described the invention and its merits what I claim is:

1. An attachment for cultivators or plows comprising a horizontally disposed share, a landside and colter along one side of the share and a guiding blade disposed at the rear of the landside and colter, and projecting below the plane of the share and having a downwardly and rearwardly curved lower cutting edge, the share, landside and colter, and guiding blade being formed as a unitary structure.

2. An attachment for cultivators or plows comprising a horizontally disposed share having a substantially V shaped front cutting edge and a substantially V shaped recess or cut out portion at the rear, a vertically disposed colter and landside at one side of the share and formed with a downwardly and forwardly inclined upper cutting edge, and a guiding blade disposed at the rear of the colter and landside and projecting below the plane of the share and having a downwardly and rearwardly curved lower cutting edge, the share, colter and landside and guiding blade being formed as a unitary structure.

In testimony whereof I affix my signature in presence of two witnesses.

JOHN T. BEASLEY.

Witnesses:
W. W. FLEMING,
C. C. LANE.